United States Patent
Durbin

(10) Patent No.: US 10,051,675 B2
(45) Date of Patent: *Aug. 14, 2018

(54) AUTOMATIC SECURE CONNECTION OVER UNTRUSTED WIRELESS NETWORKS

(71) Applicant: Verizon Patent and Licensing Inc., Arlington, VA (US)

(72) Inventor: Mark Durbin, Sachse, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 101 days.

This patent is subject to a terminal disclaimer.

(21) Appl. No.: 15/289,721

(22) Filed: Oct. 10, 2016

(65) Prior Publication Data

US 2017/0111941 A1    Apr. 20, 2017

Related U.S. Application Data

(63) Continuation of application No. 14/302,158, filed on Jun. 11, 2014, now Pat. No. 9,521,116.

(51) Int. Cl.

| H04L 12/26 | (2006.01) |
|---|---|
| H04W 76/11 | (2018.01) |
| H04W 76/02 | (2009.01) |
| H04L 12/46 | (2006.01) |
| H04W 12/08 | (2009.01) |
| H04L 29/12 | (2006.01) |
| H04W 88/02 | (2009.01) |
| H04W 84/12 | (2009.01) |

(52) U.S. Cl.
CPC ......... *H04W 76/11* (2018.02); *H04L 12/4641* (2013.01); *H04L 61/6081* (2013.01); *H04W 12/08* (2013.01); *H04W 76/021* (2013.01); *H04W 84/12* (2013.01); *H04W 88/02* (2013.01)

(58) Field of Classification Search
CPC .................................................. H04W 76/021
See application file for complete search history.

(56) References Cited

U.S. PATENT DOCUMENTS

| 7,088,989 | B2 * | 8/2006 | Guo | H04L 29/12783 |
|---|---|---|---|---|
| | | | | 342/357.64 |
| 7,502,946 | B2 * | 3/2009 | Perkins | G06F 21/6245 |
| | | | | 380/22 |
| 8,843,643 | B2 * | 9/2014 | Larson | H04L 29/12066 |
| | | | | 709/227 |
| 2004/0225895 | A1 | 11/2004 | Mukherjee et al. | |
| 2005/0111466 | A1 * | 5/2005 | Kappes | H04L 63/08 |
| | | | | 370/400 |

(Continued)

OTHER PUBLICATIONS

Fentei, "Deploy a secure public wireless network", IEEE Int. Conf. Neural Networks & Signal Processing, Nanjing, China, Dec. 14-17, 2003, vol. 2, pp. 1698-1701.

*Primary Examiner* — Guang W Li

(57) ABSTRACT

An approach for automatically securing a public wireless network is disclosed. A VPN connection platform maintains a list of available trusted wireless access identifiers to connect to a public wireless network from a mobile device. The trusted wireless access identifiers are provided to an application associated with the mobile device that selectively initiates a virtual private connection when the mobile device cannot utilize any one of the trusted wireless access identifiers.

20 Claims, 12 Drawing Sheets

(56) References Cited

U.S. PATENT DOCUMENTS

| | | |
|---|---|---|
| 2005/0260973 A1* | 11/2005 | van De Groenendaal ............................ H04L 63/102 455/411 |
| 2007/0234418 A1 | 10/2007 | Song et al. |
| 2007/0294760 A1 | 12/2007 | Sood |
| 2009/0122990 A1* | 5/2009 | Gundavelli ......... H04L 12/4641 380/278 |
| 2009/0133115 A1* | 5/2009 | Heninger, IV ...... H04L 63/0272 726/15 |
| 2009/0305671 A1* | 12/2009 | Luft .................. G06Q 30/0205 455/411 |
| 2009/0307753 A1 | 12/2009 | Dupont et al. |
| 2012/0198516 A1 | 8/2012 | Lim |
| 2012/0198519 A1* | 8/2012 | Parla .................... H04L 63/107 726/3 |
| 2013/0029641 A1* | 1/2013 | Hickie .................. G06F 21/604 455/411 |
| 2013/0042295 A1* | 2/2013 | Kelly ...................... G06F 21/53 726/1 |
| 2013/0097418 A1* | 4/2013 | Bhatt .................. H04L 63/0892 713/151 |
| 2013/0219486 A1 | 8/2013 | Work et al. |
| 2014/0098671 A1* | 4/2014 | Raleigh ............... H04L 41/5003 370/235 |
| 2014/0109214 A1 | 4/2014 | Siu |
| 2014/0199968 A1* | 7/2014 | Canpolat ............... H04W 48/20 455/411 |
| 2014/0337966 A1 | 11/2014 | Volpano et al. |
| 2015/0373029 A1* | 12/2015 | Evenden ................ G06F 21/44 726/15 |
| 2016/0183085 A1* | 6/2016 | Yerrabommanahalli ............................ H04W 12/04 713/153 |

* cited by examiner

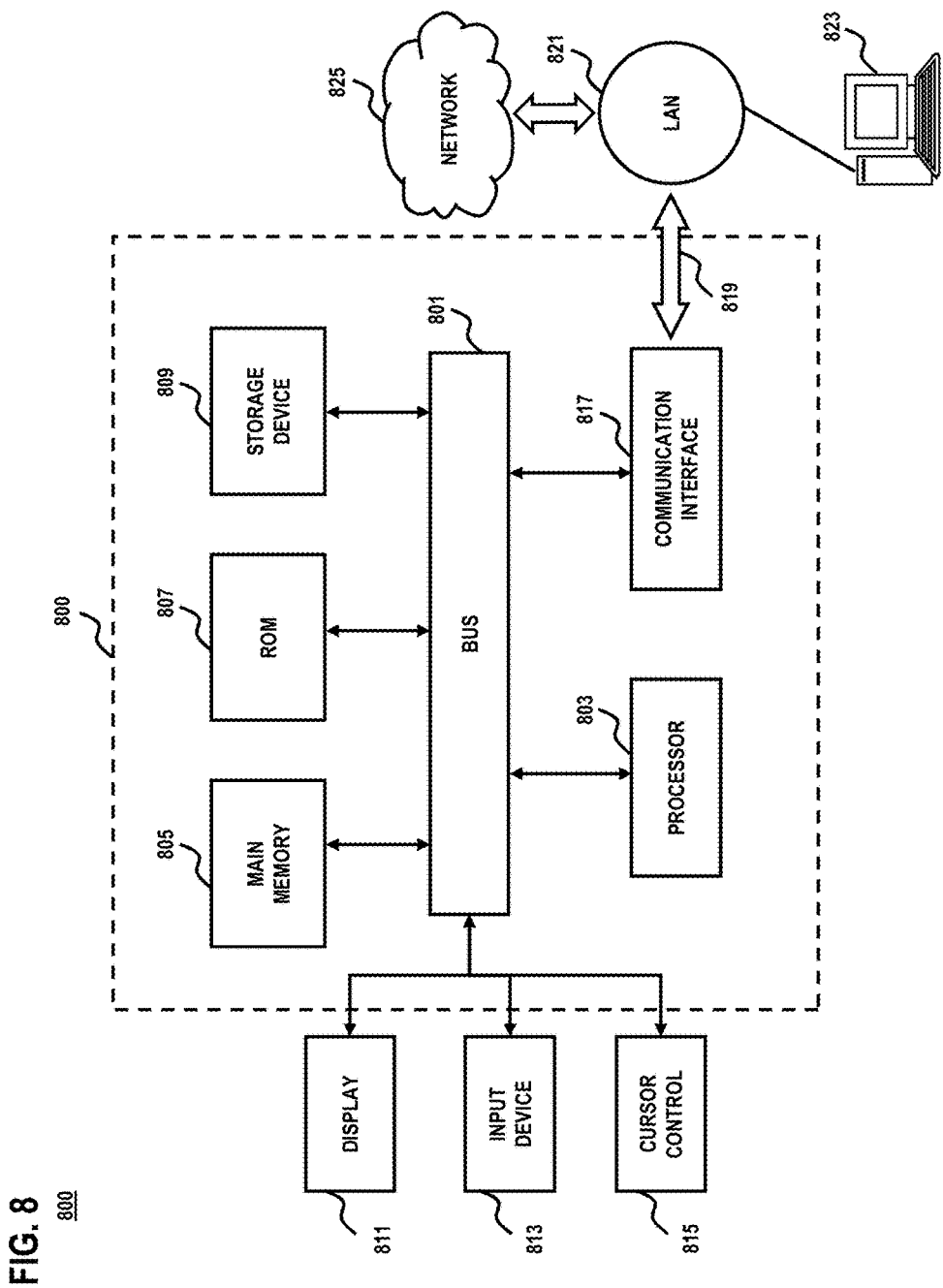

AUTOMATIC SECURE CONNECTION OVER UNTRUSTED WIRELESS NETWORKS

CROSS-REFERENCE TO RELATED APPLICATION

This application is a continuation of, and claims priority to, co-pending U.S. patent application Ser. No. 14/302,158, titled "APPARATUS, METHOD, AND SYSTEM FOR SECURING A PUBLIC WIRELESS NETWORK," filed Jun. 11, 2014, the contents of which are incorporated herein by reference in their entirety.

BACKGROUND

Network service providers and device manufacturers (e.g., wireless, cellular, etc.) are continually challenged to deliver value and convenience to consumers by, for example, providing compelling network services. One area of interest has been the development of services that enable users to establish a secure connection on public wireless networks. In particular, when devices establish a wireless connection over a public wireless network, they are susceptible to their traffic being monitored by unauthorized personnel or entity. Generally, public wireless networks are unsecured and the user of such unsecured network is at a risk of getting hacked and loosing critical or important information. Examples of user information may include passwords, bank account details, etc. The user can communicate over such unsecured networks by encrypting the communication or using advanced techniques such as secure Virtual Private Network (VPN) connections. However, these techniques may require the user to have the experience or expertise in setting up such connections manually, which is technically complex and time consuming.

EXAMPLE EMBODIMENTS

Based on the foregoing, there is a need for automatically providing a secure public wireless network to protect data and/or traffic transferred over the public wireless network on devices.

According to one embodiment, a method comprises maintaining a plurality of trusted wireless access identifiers that are available for use to connect to a public wireless network via a plurality of corresponding wireless access points, providing the plurality of trusted wireless access identifiers to an application associated with a mobile device for establishing a trusted wireless connection, determining whether the mobile device can utilize any one of the trusted wireless access identifiers to establish the trusted wireless connection, and in response to determining that the mobile device cannot utilize any one of the trusted wireless access identifiers, selectively initiating a VPN connection for the mobile device based on a command from the application.

According to another embodiment, a method comprises executing an application associated with a mobile device for establishing a trusted wireless connection, receiving a plurality of trusted wireless access identifiers that are available for use to connect to a public wireless network via a plurality of corresponding wireless access points, detecting one or more wireless access identifiers, determining whether any one of the detected wireless access identifiers correspond to the plurality of trusted wireless access identifiers, and automatically launching a session establishment process for a VPN connection if the determination is that there is no correspondence.

According to another embodiment, an apparatus comprises at least one processor, and at least one memory including computer program code for one or more computer programs, the at least one memory and the computer program code configured to, with the at least one processor, cause, at least in part, the apparatus to maintain a plurality of trusted wireless access identifiers that are available for use to connect to a public wireless network via a plurality of corresponding wireless access points, provide the plurality of trusted wireless access identifiers to an application associated with a mobile device for establishing a trusted wireless connection, determine whether the mobile device can utilize any one of the trusted wireless access identifiers to establish the trusted wireless connection, and in response to determining that the mobile device cannot utilize any one of the trusted wireless access identifiers, selectively initiate a virtual private connection for the mobile device based on a command from the application.

According to another embodiment, a system comprising an automated public wireless network securing platform configured to maintain a plurality of trusted wireless access identifiers that are available for use to connect to a public wireless network via a plurality of corresponding wireless access points, provide the plurality of trusted wireless access identifiers to an application associated with a mobile device for establishing a trusted wireless connection, determine whether the mobile device can utilize any one of the trusted wireless access identifiers to establish the trusted wireless connection, and in response to determining that the mobile device cannot utilize any one of the trusted wireless access identifiers, selectively initiate a VPN connection for the mobile device based on a command from the application.

In various example embodiments, the methods (or processes) can be accomplished on the service provider side or on the mobile device side or in any shared way between service provider and mobile device with actions being performed on both sides.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 8 is a diagram of a computer system that can be used to implement various exemplary embodiments.

DETAILED DESCRIPTION OF PREFERRED EMBODIMENTS

An apparatus, method, and system for automatically securing a public wireless network in a mobile device, is described. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention. Although the various exemplary embodiments are described with respect to a mobile device, it is contemplated that these embodiments have applicability to other architectures.

Figure 1:
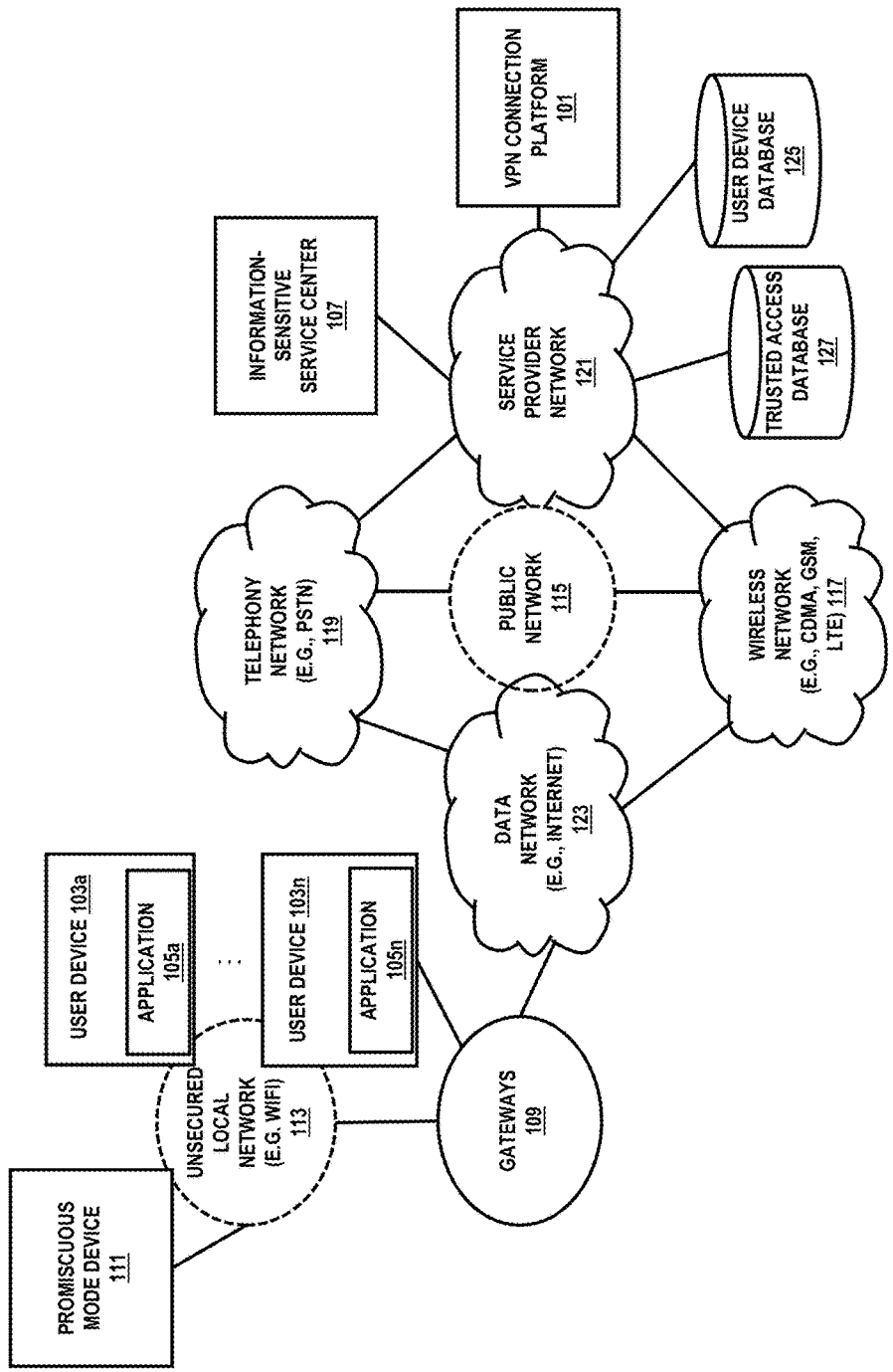
FIG. 1 is a diagram of a system for establishing a Virtual Private Network (VPN) connection, according to one embodiment.

FIG. 1 is a diagram of a system capable for establishing a Virtual Private Network (VPN), according to an embodiment. For the purpose of illustration, a system 100 employs, in certain embodiments, a VPN connection platform 101 for providing a VPN connection to multiple user devices 103a-103n, hereinafter referred to as mobile devices 103. In one implementation, the VPN connection platform 101 may provide a secure wireless connection to public networks (e.g., telephony networks, data networks, wireless networks, etc.) for retrieving sensitive information from a data center. In one scenario, the sensitive information may include bank account details, insurance policies data, passwords, and the like. In another scenario, the data center may be a bank, an insurance company, social networks, and/or any other source that may manipulate and/or store sensitive information. A VPN connection may be established between the VPN connection platform 101, and the mobile device 103a-103n by using applications 105a-105n (or hereinafter referred to as applications 105) when a user of the mobile device 103 desires to access a service from an information sensitive service center 107. In one embodiment, the information sensitive service center 107 may include banks, insurance companies, social networks, and the like. The mobile device 103 may access the information from the information sensitive service center 107 via gateways 109. In some embodiments, the gateway 109 may further include sample gateway applications to enable the mobile users to use and configure local communication network, data management, and a cloud agent/adapter for handling the communication with upstream applications. In one embodiment, various wireless access points (not shown) are used in order to connect to the public wireless networks.

Further, the mobile device 103 may communicate with the information sensitive service center 107 through various other networks 115-123. For illustrative purposes, the networks 115-123 may be any suitable wired and/or wireless networks, and are managed by one or more service providers. For example, a public network 115 may be used to establish the wireless network for transmitting the data in digital form. Further, wireless network 117 may employ various technologies including, for example, Code Division Multiple Access (CDMA), Enhanced Data Rates For Global Evolution (EDGE), General Packet Radio Service (GPRS), Mobile Ad Hoc Network (MANET), Global System For Mobile Communications (GSM), 4G Long-Term Evolution (LTE), Internet Protocol Multimedia Subsystem (IMS), Universal Mobile Telecommunications System (UMTS), etc., as well as any other suitable wireless medium, e.g., microwave access (WiMAX), Wireless Fidelity (WiFi), satellites, and the like. Telephony network 119 may include a circuit-switched network, such as the Public Switched Telephone Network (PSTN), an Integrated Services Digital Network (ISDN), a Private Branch Exchange (PBX), or other like networks. Meanwhile, data network 123 may be any Local Area Network (LAN), Metropolitan Area Network (MAN), Wide Area Network (WAN), the Internet, or any other suitable packet-switched network, such as a commercially owned, proprietary packet-switched network, such as a proprietary cable or fiber-optic network.

Although depicted as separate entities, the networks 115-123 may be completely or partially contained within one another, or may embody one or more of the aforementioned infrastructures. For instance, the service provider network 121 may embody circuit-switched and/or packet-switched networks that include facilities to provide for transport of circuit-switched and/or packet-based communications. It is further contemplated that the networks 115-123 may include components and facilities to provide signaling and/or bearer communications between the various components or facilities of the system 100. In this manner, the networks 115-123 may embody or include portions of a signaling system 7 (SS7) network, or other suitable infrastructure to support control and signaling functions. In addition, the system 100 may operate as separate parts that rendezvous and synchronize periodically to form a larger system with similar characteristics. Generally, the public wireless networks are not secured networks to access confidential data from the data centers. Further, a hacker using a promiscuous mode device 111 may monitor and gather the sensitive information from the mobile device 103 when the wireless network is established between the mobile device 103 and the information sensitive service center 107 through an unsecured local network 113. In one implementation, the unsecured local network 113 may be an open or public wireless network that does not require passwords, or user login credentials for establishing the wireless connection. Typically, the public wireless networks that are available in coffee shops, cyber cafes, airports, offices, etc. are unsecured public wireless networks. On the other hand, the mobile user may establish a connection to the wireless network through a secured or trusted local network. Generally, the trusted local network is locked and protected with encryption keys by an administrator, and therefore a password and/or an access key is required in order to establish the wireless connection with the trusted local network. The trusted local network may include security protocols to secure the wireless network. In one embodiment, the security protocols may include Wired Equivalent Privacy (WEP), Wi-Fi Protected Access (WPA), Wi-Fi Protected Access 2 (WPA2-PSK), and the like. Further, the promiscuous mode device 111 may enable a user (e.g., a hacker) to intercept and read data packets of the sensitive information transmitted from the mobile device 103 to the information sensitive service center 107 through the unsecured local network 113.

Further, in order to establish the VPN connection, the VPN connection platform 101 may extract user identification data from a user device database 125. In one embodiment, the user data may include Media Access Control address (MAC address) of the mobile device 103, user ID, passwords, mobile device information, and the like. A trusted access database 127 may store a list of trusted local networks or trusted WiFi connections for establishing the wireless network between the mobile device 103 and the information sensitive service center 107 via wireless access points. The trusted access database 127 may store a list of trusted local networks and/or wireless identifiers corresponding to the mobile device 103. Further, the trusted access database 127 may store a list of trusted wireless access identifiers of the trusted local networks, wherein the trusted wireless access identifiers may include Service Set Identifiers (SSIDs), hardware identifiers, contextual identifiers, or combination thereof. The trusted access database 127 may also store a list of local networks which are trusted by the VPN connection platform 101 in order to establish the secured communication network, according to an embodiment. In one example embodiment, the list of trusted local networks may be stored in the user device. In another example embodiment, the users may access the list of trusted local networks via their respective devices 103, wherein the devices 103 may access the database 127 via service provider network 121.

Figure 2:
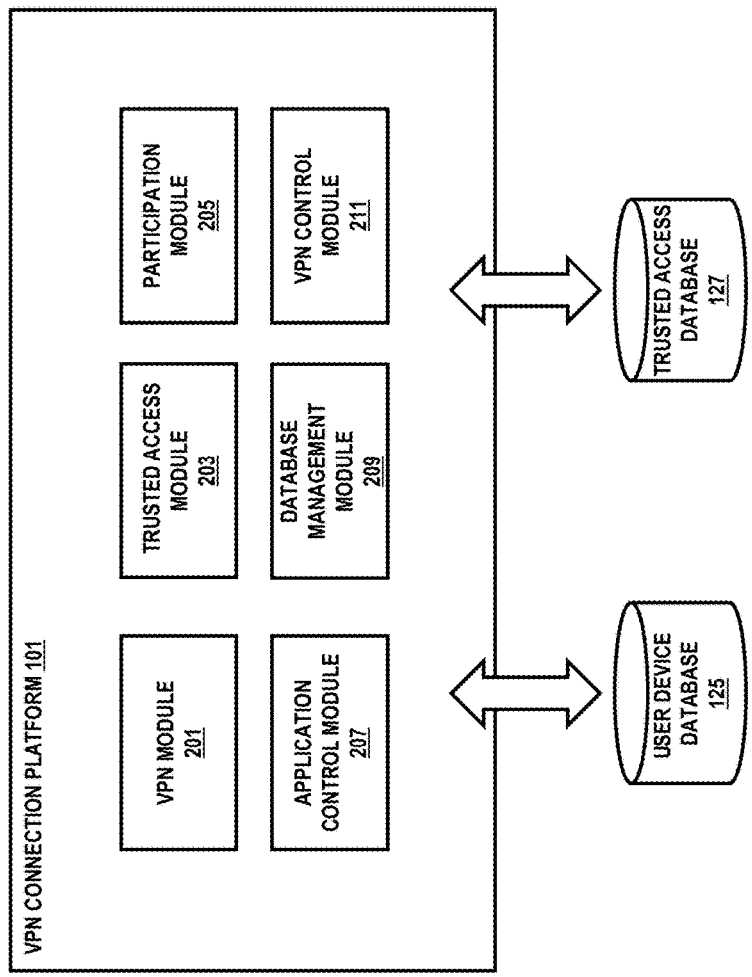
FIG. 2 is a diagram illustrating components of a VPN connection platform for establishing the VPN connection, according to one embodiment.

FIG. 2 is a diagram of components of the VPN connection platform 101 for establishing the VPN connection, according to one embodiment. The VPN connection platform 101 may include a VPN module 201, a trusted access module 203, a participation module 205, an application control module 207, a database management module 209, and a VPN control module 211.

The VPN module 201 may establish a VPN session or a connection to provide secure communication within public wireless networks, according to one embodiment. In one scenario, when the mobile device 103 is trying to establish a connection to the information sensitive service center 107 through the unsecured local network 113, the VPN module 201 automatically establishes the VPN connection between the mobile device 103 and the information sensitive service center 107 through a VPN service provider in order to provide a secure communication. Further, the VPN module 201 may provide session set-up information for establishing the VPN connection over a communication connection. In one embodiment, the communication connection is established on an alternate path that is different from the wireless networks supported by the various wireless access points. For example, the VPN module 201 may establish the VPN connection through an encrypted communication path from the wireless access point to the information sensitive service center 107 via the VPN service provider. Further, the session set-up information specifies that the VPN connection may be established by using the various wireless access points that are associated with the multiple trusted wireless access identifiers. In another embodiment, the session set-up information specifies that the VPN connection may be established by using different wireless access points not associated with the multiple trusted wireless access identifiers.

The VPN module 201 may further select the VPN connection based on the multiple trusted wireless access identifiers, in an embodiment. The trusted wireless access identifiers may include Service Set Identifiers (SSIDs), hardware identifiers, contextual identifiers, or combination thereof. In one implementation, the Service Set Identifiers (SSIDs) may be selected from a list of multiple wireless connections that are trusted or recognized by the mobile user and are also associated with the mobile device 103. In another embodiment, the trusted wireless connections may be established based on corporate control configurations or user configurations associated with the mobile devices 103. Further, the VPN module 201 initiates the selected VPN connection from the mobile device 103 to the information sensitive service center 107 based on the trusted wireless access identifiers.

The trusted access module 203 may determine whether the mobile device 103 is establishing the wireless communication network by using the trusted wireless access identifiers or not. In an embodiment, the wireless access identifiers are determined as trusted identifiers based on attributes such as a location of the mobile devices 103 (e.g., in a home, office, coffee shop, etc.), available wireless networks, and the like. Further, the trusted access module 203 may provide a list of trusted wireless access identifiers to the VPN module 201, in an embodiment. A list of the trusted wireless access identifiers is provided to the VPN module 201 in order to establish a secured wireless network connection with the trusted public wireless networks. Further, the trusted access module 203 may automatically provide access to the trusted wireless access identifiers in order to establish the wireless communication network from the mobile device 103 to the information sensitive service center 107, in another embodiment. The trusted access module 203 may also present a most suitable trusted wireless access identifier to the mobile user to establish the trusted wireless communication network.

The participation module 205 may enable mobile users to utilize VPN services, in an embodiment. The users of the mobile devices 103 register their mobile devices 103 to a VPN data center in order to establish secured VPN networks on their mobile devices 103. In one embodiment, the participation module 205 enables the users (e.g., users with registered mobile devices to the VPN data center) of the VPN service to create a list of trusted wireless access identifiers. In one scenario, the list of trusted wireless access identifiers may be accessed by one or more users via their respective device 103. The users may store the trusted network in the database 127. In another scenario, users may set up trusted networks manually via their respective device 103. This method involves users accessing the list of trusted wireless access identifiers from the database 127, and selecting their preferred wireless access identifiers for setting a trusted network. Further, the participation module 205 may provide the VPN services to the mobile users who have subscribed for these services, according to an embodiment.

The application control module 207 enables the users to download and install an application on their registered mobile devices 103 in order to establish the secured VPN connections through the VPN data centers. In one embodiment, the application control module 207 may receive a request from the mobile device 103 to access the application and to establish the VPN connection in the public wireless networks. In one implementation, the application is operated in background of the mobile device 103 to determine the need for establishing the VPN communication network. Further, the application control module 207 enables the mobile user to configure the application, according to one embodiment. The mobile user may select trusted wireless access identifiers from a list of recognized or trusted WiFi services connected to the mobile device 103. These identifiers are then added to the application that further establishes the VPN communication network if any other wireless access identifier is detected for communication networks.

The application control module 207 may further receive a request from the mobile device 103 to access the application for establishing the VPN connection when only unsecured public wireless networks are available. In another embodiment, the application control module 207 monitors wireless access points that utilizes the trusted wireless access identifiers. In an embodiment, the application control module 207 enables the user of the mobile device 103 to manually select a trusted wireless network from a list of available wireless network to initiate a VPN connection over the trusted wireless network.

The database management module 209 manages data stored in the user device database 125 and the trusted access database 127, according to one embodiment. The data may include user data, device data, user configuration data, trusted wireless networks, wireless access identifiers, and the like. In an embodiment, the user data may include Media Access Control address (MAC address) of the mobile device 103, user ID, passwords, mobile device information, and the like. Further, the database management module 209 updates the user data in the databases 125-127. For example, when new users subscribe for the VPN service in the VPN data center, their user data, configurations, trusted wireless access identifiers and networks, etc. are updated and stored in the databases 125-127.

The VPN control module 211 provides a VPN access command to the mobile devices 103, in an embodiment. For example, if only unsecured wireless networks are available, then the VPN control module 211 may suggest the mobile user connect through a specific unsecured wireless network and then a VPN connection is established.

Figure 3:
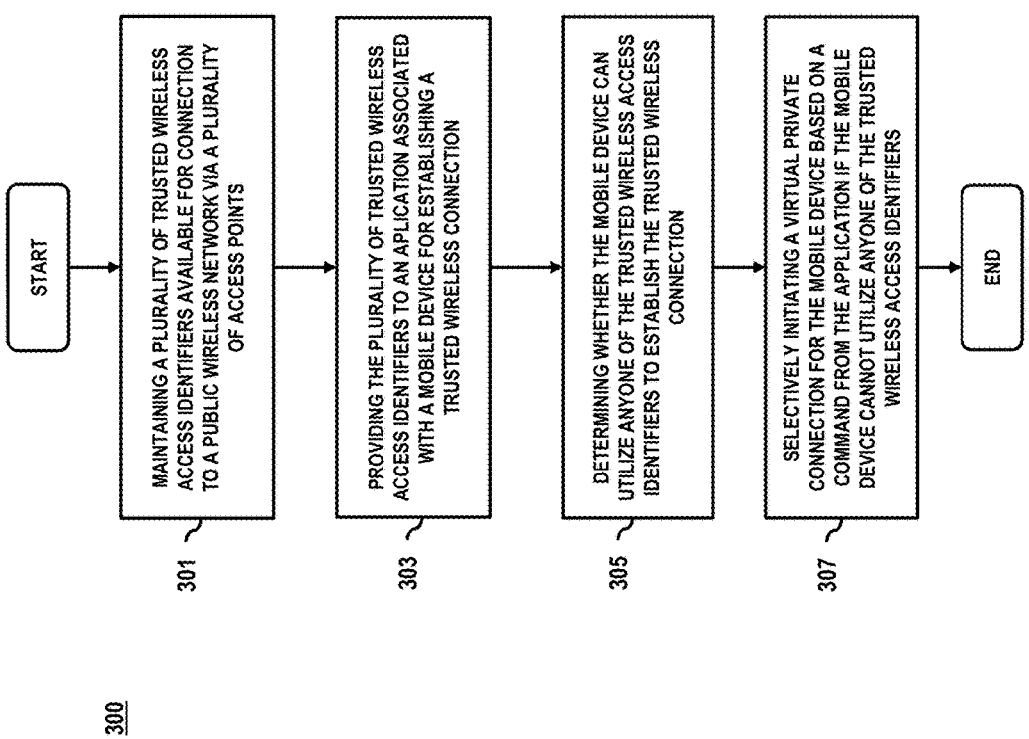
FIG. 3 is a flowchart of a process for initiating the VPN connection for the mobile device, according to one embodiment.

FIG. 3 is a flowchart for initiating the VPN connection for the mobile devices 103, according to an embodiment. At step 301, a list of multiple trusted wireless access identifiers that are available for connection to a public wireless network through multiple wireless access points are maintained (e.g., by the VPN connection platform 101). In one implementation, the list of trusted wireless access identifiers may be provided by the user of the mobile device 103. Further, the list of the trusted wireless access identifiers may be displayed on a Graphical User Interface (GUI), described in FIGS. 7A through 7C below, to select a trusted wireless access identifier in order to establish the secured wireless connection. Further, the mobile device 103 may establish the wireless connection through the public wireless network via multiple wireless access points.

At step 303, the list of trusted wireless access identifiers is provided (e.g., by the VPN connection platform 101) to an application associated with the mobile device 103. The application may run in background of the mobile device 103 and further uses minimal resources and power of the mobile device 103, in an embodiment. Further, the application operates in a same way on all types of mobile devices 103 in order to have a standard user interface for the application, in another embodiment. The trusted wireless access identifiers may be provided to the application for establishing a trusted wireless connection through the public wireless networks.

At step 305, it is determined whether the mobile device 103 may utilize any one of the trusted wireless access identifiers to establish the trusted wireless connection. This may be determined by the VPN connection platform 101. In one embodiment, if the mobile device 103 utilizes one of the available trusted wireless access identifier, then the VPN connection platform 101 establishes the wireless connection through the trusted wireless networks. If the mobile device 103 does not utilize any one of the available trusted wireless access identifiers, then the process proceeds towards step 307 below.

At step 307, a VPN connection is selectively initiated (e.g., by the VPN connection platform 101) for the mobile device 103, in one embodiment. The VPN connection platform 101 may establish the VPN connection for the mobile device 103 based on a command received from the application. For example, when the VPN connection platform 101 determines that the mobile device 103 is not utilizing any of the trusted wireless access identifiers to establish the secure wireless connection, then the application associated with the mobile device 103 transmits a command to the VPN connection platform 101 to initiate the VPN connection for the mobile device 103. In one embodiment, the VPN connection is created simply because none of the trusted wireless access identifiers have been used. In one embodiment, the VPN connection is encrypted for transmitting and/or receiving data on the mobile device 103 and therefore, the promiscuous mode device 111 cannot monitor and gather the sensitive information.

Figure 4:
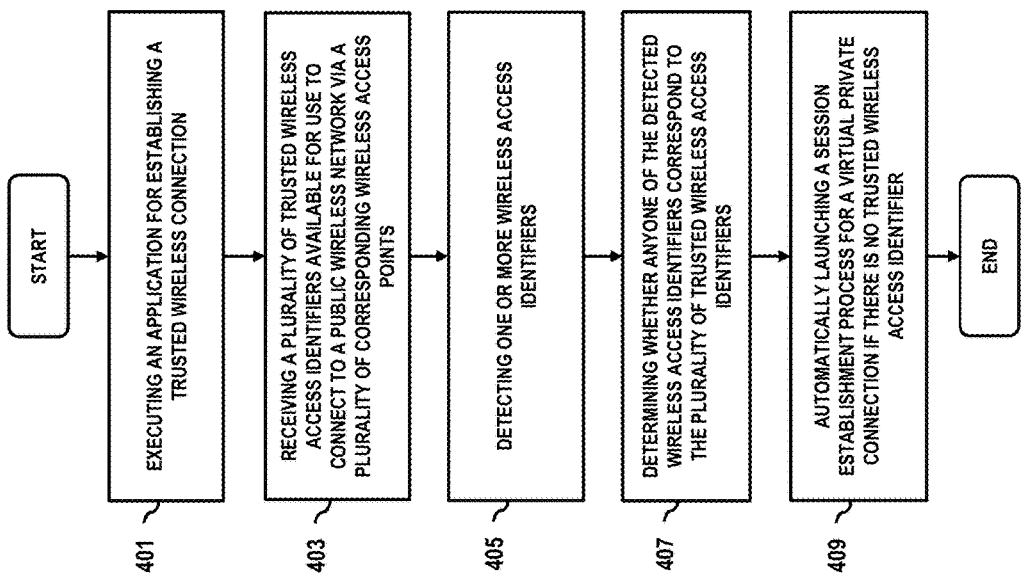
FIG. 4 is a flowchart of a process for automatically establishing the VPN connection for the mobile device, according to one embodiment.

FIG. 4 is a flowchart for automatically establishing the VPN connection or session for the mobile device 103, according to one embodiment. At step 401, an application associated with the mobile device 103 is executed to establish a trusted wireless connection. In one scenario, the user downloads and installs the application in the mobile device 103, provided by the VPN data centers and/or VPN service providers. In another embodiment, the application runs in background of the mobile device 103 and further uses minimal resources and power of the mobile device 103. Also, the application may operate in a same way on all types of mobile devices 103 in order to have a standard user interface of the application.

At step 403, various trusted wireless access identifiers that are available for use to connect the mobile device 103 to a public wireless network are received (e.g., by the application). In one embodiment, the trusted wireless access identifiers may be sent to the user device 103 and automatically used in connecting the device to the untrusted network. In one embodiment, the trusted wireless access identifiers may be selected by the user from the mobile device 103 to connect to the public wireless networks. Further, the user may connect the mobile device 103 to the public wireless networks through multiple wireless access points associated with the public wireless networks.

At step 405, one or more available wireless access identifiers is/are detected in order to establish the wireless connection through the public wireless networks, in an embodiment. The wireless access identifiers may include SSIDs, MAC addresses, or other identifiers. The detection may be through WiFi or other wireless means by using the mobile device 103 to scan for nearby access points. Further, at step 407, it is determined whether any one of the detected wireless access identifiers correspond to the multiple trusted wireless access identifiers. This may be determined by the application. If the detected wireless access identifier corresponds to one of the trusted wireless access identifier, then the mobile device 103 may establish the wireless connection through these wireless access identifiers. Otherwise, the process proceeds towards step 409.

At step 409, a session is automatically launched to establish the VPN connection if no trusted wireless access identifier is determined, in one embodiment. For example, when the application determines that the available wireless access identifiers are not trusted by the user of the mobile device 103, then the application transmits a command to a VPN data center and/or VPN service provider to automatically establish the VPN connection for the mobile device 103. In other embodiments, the user of mobile device 103 may add trusted wireless access identifiers based on the detected untrusted wireless access identifiers, prior to establishing a VPN session.

Figure 5:
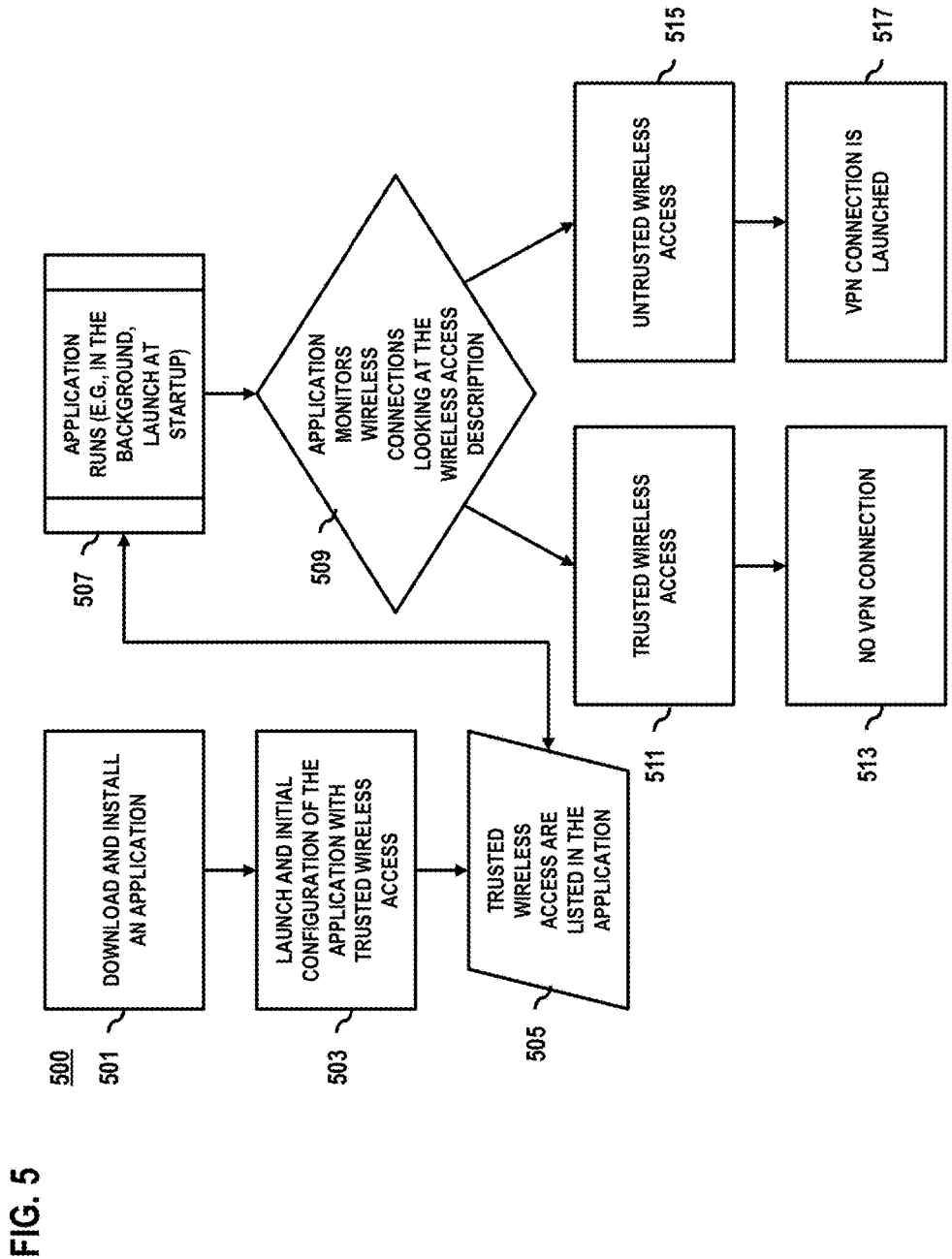
FIG. 5 is a flow diagram for enabling the mobile device to connect to the VPN connection, according to one embodiment.

FIG. 5 is a flow diagram for enabling the mobile device 103 to connect to the VPN connection, according to an embodiment. At step 501, the application 105 is downloaded and installed on to the mobile device 103. In one scenario, the user downloads and installs the application 105 through the mobile device 103. In one scenario, the application 105 is pushed onto the mobile device 103 by the VPN service provider or other third party. Further, the application 105 may be downloaded from the Internet.

At step 503, the application is launched in the mobile device 103 and is further configured based on inputs provided by a user of the mobile device 103. In an embodiment, the inputs may include user data such as SSID, Media Access Control address (MAC address) of the mobile device 103, user ID, passwords, mobile device information, and the like. The application associated with the mobile device 103 is configured with trusted wireless access identifiers of trusted wireless networks, in one embodiment. In other embodiments, the trusted wireless access identifiers may be added to the application automatically based on past use or other contextual information such as location or time of use.

At step 505, trusted wireless access identifiers are listed in the application, in an embodiment. The user of the mobile device 103 lists multiple wireless access identifiers in the application and stores it as trusted wireless access identifiers for establishing a wireless connection for the mobile device 103 to the information sensitive service center 107. In one embodiment, the trusted wireless access identifiers may include Service Set Identifiers (SSIDs), hardware identifiers, contextual identifiers, or combination thereof. These identifiers may be used to identify trusted and secured public wireless networks in order to establish a secure connection to the public wireless network.

At step 507, the application runs in the mobile device 103 of the user. In an embodiment, the application runs in background of the mobile device 103 and uses minimal resources and power of the mobile device 103. In another embodiment, the application may be launched at the startup of another application requiring the use of a wireless connection associated with the mobile device 103.

At step 509, the application monitors wireless connections that are available based on their wireless access description. In an embodiment, the wireless access description may include wireless access identifiers of the available wireless connections. For example, the wireless access identifiers may simply be noted as a wireless connection available for use. In other embodiments, the wireless access descriptions may also include a statement of trust or potential security risk. The wireless access descriptions of trustworthiness could also be taken from knowledge of connections of other users. If the description demonstrates trustworthiness the application continues to step 511 below, if the description demonstrates untrustworthiness the application continues to step 515 below.

At step 511, if the application monitors that the trusted wireless access connection is available, then the process proceeds towards step 513 and no VPN connection is established. Further, if the application monitors that only unsecured wireless access connections are available at step 515, then the process proceeds towards step 517 and automatically establishes a VPN connection for the mobile device 103 in order to provide security and protect data transferred over the public wireless network.

Figure 6A:
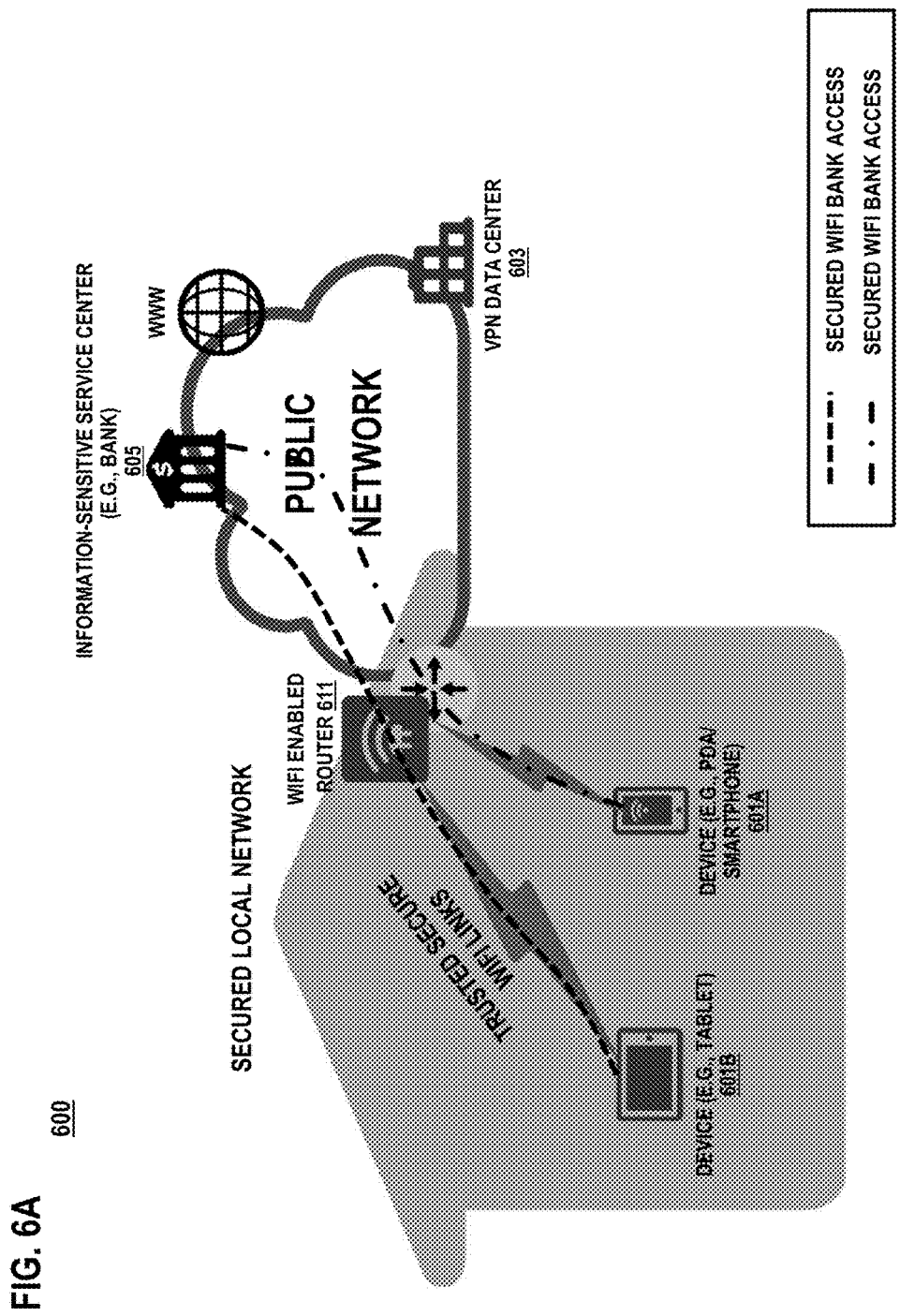
FIG. 6A illustrates a secured local network, according to one embodiment.

FIG. 6A illustrates a secured local network, according to one embodiment. FIG. 6A displays an exemplary environment having mobile devices 601a-601b, herein after referred to as mobile device 601, a VPN data center 603, an information sensitive service center 605, WiFi enabled routers 611, trusted secured WiFi links, public wireless networks, etc. The application 105 installed on the mobile device 601, recognizes secured and/or unsecured wireless networks that are available at the time the mobile device 601 establishes a connection to the public wireless network. The application 105 may then enable the mobile device 601 to establish a secured connection to the wireless network to access data from the information sensitive service center 605. In an embodiment, the information sensitive service center 605 may include a bank, an insurance company, social networks, etc. When a user of the mobile device 601 desires to access sensitive information (e.g., bank account details, insurance policies data, passwords, etc.) from the information sensitive service center 605, through a secured local network (e.g., home network), the application 105 recognizes the local network as a secured local network based on wireless access identifiers associated with the local network. In an embodiment, the wireless access identifiers may include Service Set Identifiers (SSIDs), hardware identifiers, contextual identifiers, or combination thereof. When the application 105 recognizes the wireless access identifier as a secured wireless access identifier, then a secured WiFi connection to the information sensitive service center 605 is established through WiFi enabled routers 611 and therefore, no VPN connection is initiated. Further, the secured local network is enabled with security protocols such as Wired Equivalent Privacy (WEP), Wi-Fi Protected Access (WPA), Wi-Fi Protected Access 2 (WPA2-PSK), and the like.

Figure 6B:
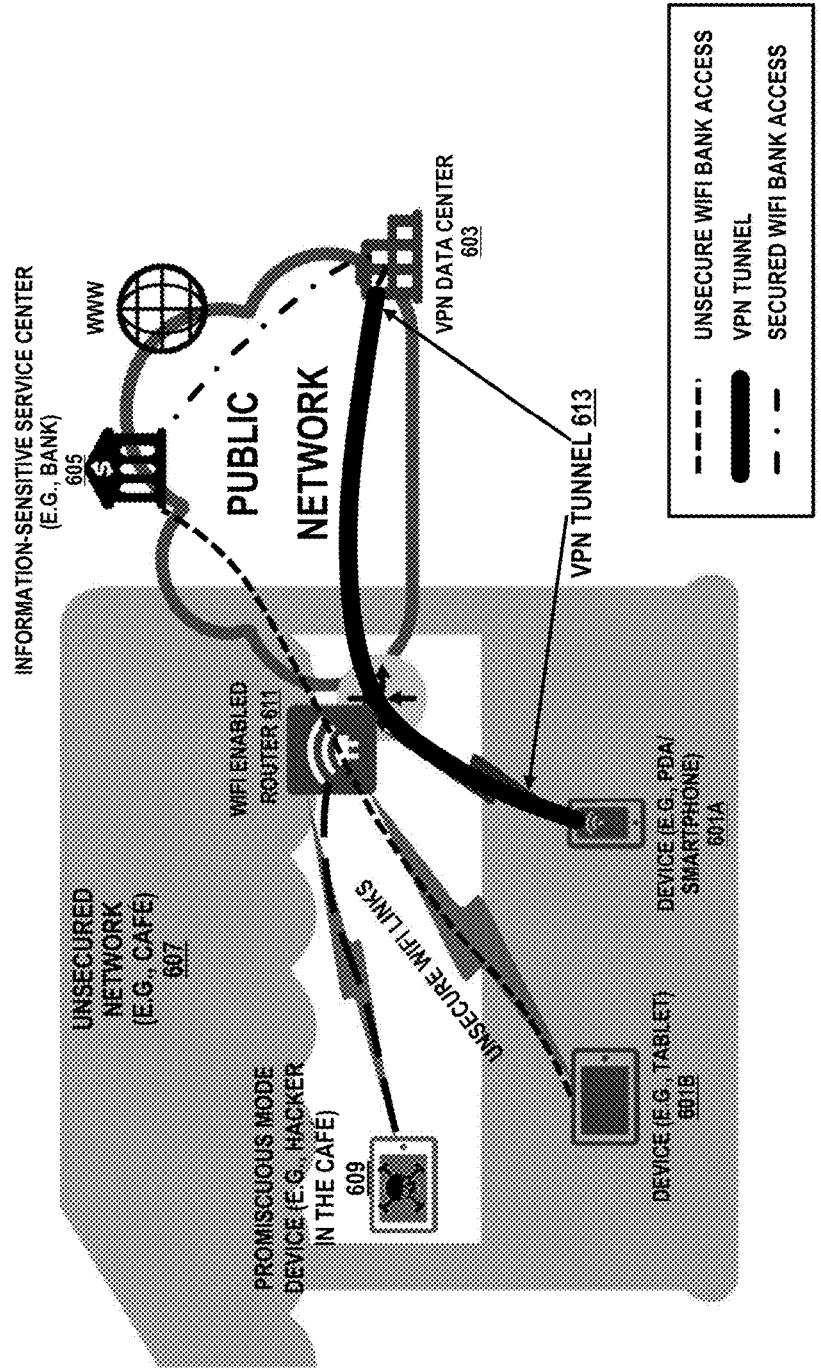
FIG. 6B illustrates the VPN connection in an unsecured network, according to one embodiment.

FIG. 6B illustrates the VPN connection in an unsecured local network, according to one embodiment. If the user of the mobile device 601 establishes a connection to the information sensitive service center 605 through an unsecured public wireless network such as from a cyber café, then a promiscuous mode device 609 (e.g., device of a hacker in the café) may monitor and gather all the sensitive information transmitted and/or received at the mobile device 601. When the application 105 associated with the mobile device 601 detects that a connection is to be established through an unsecured public wireless network then the application 105 transmits a command to the VPN data center 603 to automatically initiate a VPN connection for the mobile device 601. In an embodiment, a VPN tunnel or VPN connection is automatically initiated from the mobile device 601 to the VPN data center 603 when the user connects to an "open" or public WiFi network whose wireless access identifiers are not present in the list of the trusted wireless access networks. The VPN data center 603 may then connect the mobile device 601 to the information sensitive service center 605 through an encrypted communication path that is routed via the VPN data center 603. When the encrypted path is established for the mobile device 601, then the promiscuous mode device 609 may not be able to gather the sensitive information about the user's activities on the wireless public networks.

Figure 7A:
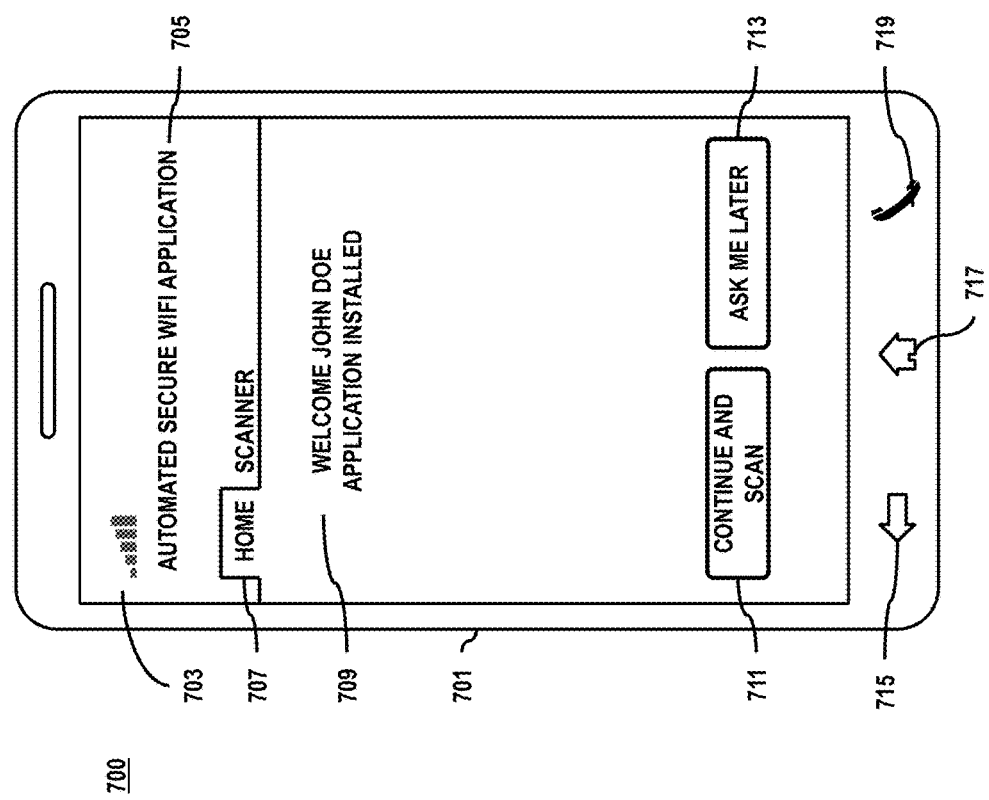
FIGS. 7A-7C are diagrams of a Graphical User Interface (GUI) of an application running on the mobile device, according to one embodiment.
Figure 7B:
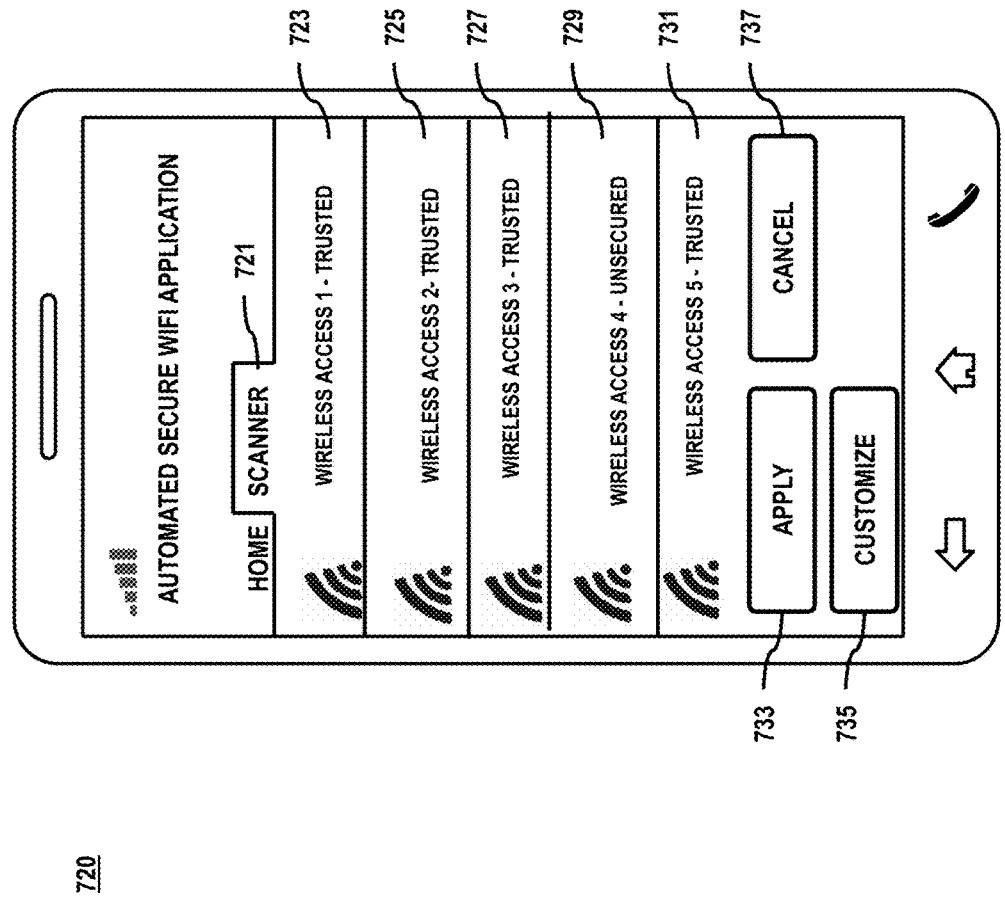
Figure 7C:
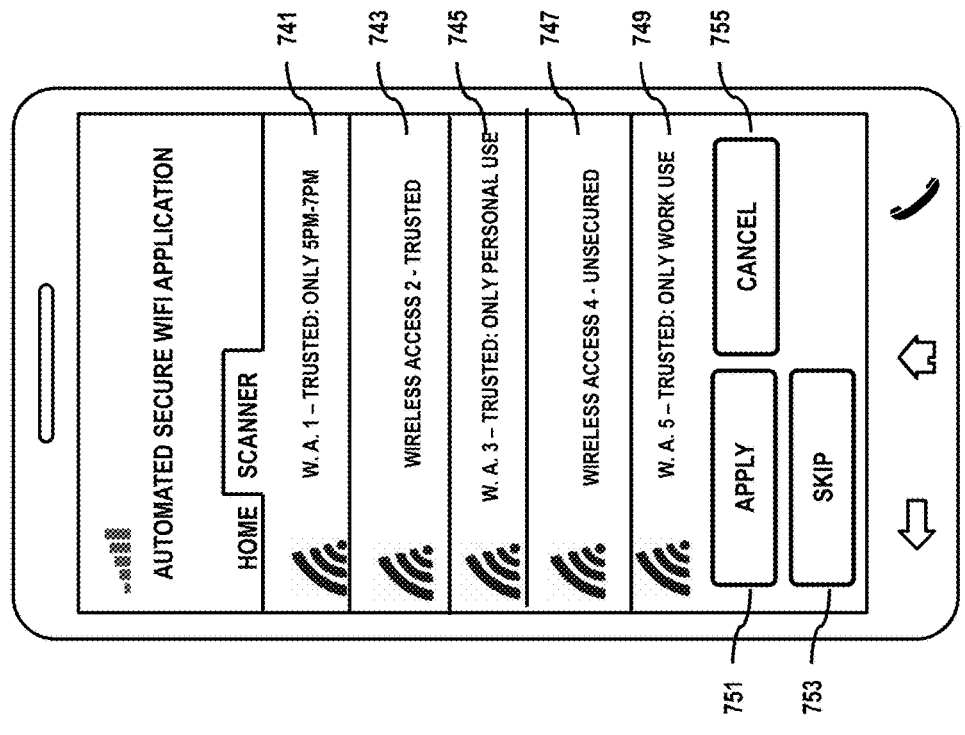

FIGS. 7A-7C are diagrams of a Graphical User Interface (GUI) of an application running on the mobile device, according to one embodiment. On a mobile device 701, a signal or network strength icon 703 is displayed, as shown in FIG. 7A. An application 705 runs in the mobile device 701 that displays a home tab 707 and a welcome message 709 to a user which shows the application 705 has been installed in the mobile device 701. Further, multiple control options are displayed in the application 705, such as continue and scan button 711 for detecting available trusted wireless networks, then if the user desires to perform scanning at a later stage then ask me later button 713 may be used. The mobile device 701 may have further control options such as a back button 715 to go back and/or navigate to a back screen, a home button 717 to view applications installed in the mobile device 701, and a call button 719 for dialing and/or receiving phone calls. These control options may also have secondary functions such as searching within the application or entering the application's menu/settings.

Further, as shown in FIG. 7B, when the user selects a scanner tab 721, a list of available trusted and/or unsecured wireless access networks and identifiers is presented to the user, such as a wireless access 1-trusted 723, a wireless access 2-trusted 725, a wireless access 3-trusted 727, a wireless access 4-unsecured 729, and a wireless access 5-trusted 731. The user may select any one of the wireless access networks and then click the apply button 733 to establish a secured wireless connection to the wireless network. If the user desires to cancel the selection of the wireless access network, he/she may click on a cancel button 737. Further, the user of the mobile device 701 may customize the application 705 by using customize button 735 and then providing inputs such as a list of trusted wireless access networks to establish a secure wireless access network.

For example, as shown in FIG. 7C, the user of the mobile device 701 customizes the application 705 such as a wireless access 1-trusted 741 may be used only for a specific duration of time such as between 5 PM to 7 PM, a wireless access 2-trusted 743 may be used any time, or any day, a wireless access 3-trusted may only be used for personal use 745 (as opposed to, for example, work use), a wireless access 4 is an unsecured network 747 and for this network, the application 705 may have to establish a VPN connection, and a wireless access 5-trusted network 749 may only be used for work purposes, and the like. The user may select any one of the available wireless network and then click on apply icon 751 for establishing a secured connection to the public wireless networks. The user may further skip and/or cancel the selection of the wireless network by clicking on a skip icon 753 or a cancel icon 755.

FIG. 8 illustrates a computing hardware (e.g., mobile system) 800 on which exemplary embodiments can be implemented. The mobile system 800 includes a bus 801 or other communication mechanism for communicating information and a processor 803 coupled to the bus 801 for processing the information. The mobile system 800 also includes a main memory 805, such as a Random Access Memory (RAM) or other dynamic storage device, coupled to the bus 801 for storing the information and instructions to be executed by the processor 803. The main memory 805 may also be used for storing temporary variables or other intermediate information during execution of instructions by the processor 803. The mobile system 800 may further include a Read Only Memory (ROM) 807 or other static storage device coupled to the bus 801 for storing static information and instructions for the processor 803. A storage device 809, such as a magnetic disk or an optical disk, is coupled to the bus 801 for persistently storing information and instructions.

The mobile system 800 may be coupled via the bus 801 to a display 811, such as a Cathode Ray Tube (CRT), a liquid crystal display, an active matrix display, or a plasma display, for displaying information to the mobile user. An input device 813, such as a keyboard including alphanumeric and other keys, is coupled to the bus 801 for communicating information and command selections to the processor 803. Another type of a user input device may be a cursor control 815, such as a mouse, a trackball, or cursor direction keys, for communicating direction information and command selections to the processor 803 and for controlling cursor movement on the display 811.

According to an exemplary embodiment, the processes described herein are performed by the mobile system 800, in response to the processor 803 executing an arrangement of instructions contained in the main memory 805. Such instructions can be read into the main memory 805 from another computer-readable medium, such as the storage device 809. Execution of the arrangement of instructions contained in the main memory 805 causes the processor 803 to perform the process steps described herein. One or more processors in a multi-processing arrangement may also be employed to execute the instructions contained in the main memory 805. In alternative embodiments, hard-wired circuitry may be used in place of or in combination with software instructions to implement exemplary embodiments. Thus, exemplary embodiments are not limited to any specific combination of hardware circuitry and software.

The mobile system 800 may also include a communication interface 817 coupled to the bus 801. The communication interface 817 provides a two-way data communication coupling to a network link 819 connected to a Local Area Network (LAN) 821. For example, the communication interface 817 may be a Digital Subscriber Line (DSL) card or modem, an Integrated Services Digital Network (ISDN) card, a cable modem, a telephone modem, or any other communication interface to provide a data communication connection to a corresponding type of communication line. As another example, the communication interface 817 may be a Local Area Network (LAN) card (e.g., for Ethernet™ or an Asynchronous Transfer Mode (ATM) network) to provide a data communication connection to a compatible LAN. Wireless links can also be implemented, in one embodiment. In any such implementation, the communication interface 817 sends and receives electrical, electromagnetic, or optical signals that carry digital data streams representing various types of information. Further, the communication interface 817 may include peripheral interface devices, such as a Universal Serial Bus (USB) interface, a Personal Computer Memory Card International Association (PCMCIA) interface, etc. Although a single communication interface 817 is depicted in FIG. 8, multiple communication interfaces may also be employed.

The network link 819 typically provides data communication through one or more networks to other data devices. For example, the network link 819 may provide a connection through the LAN 821 to a host computer 823, which has connectivity to a network 825 (e.g., a Wide Area Network (WAN) or the global packet data communication network now commonly referred to as the "Internet") or to data equipment operated by a service provider. The LAN 821 and the network 825 both use electrical, electromagnetic, or optical signals to convey information and instructions. The signals through the various networks and the signals on the network link 819 and through the communication interface 817, which communicate digital data with the mobile system 800, are exemplary forms of carrier waves bearing the information and instructions.

The mobile system 800 may send messages and receive data, including program code, through the network(s), the network link 819, and the communication interface 817. In the Internet example, a server (not shown) might transmit requested code belonging to an application program for implementing an exemplary embodiment through the network 825, the LAN 821 and the communication interface 817. The processor 803 may execute the transmitted code while being received and/or store the code in the storage device 809, or other non-volatile storage for later execution. In this manner, the mobile system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media may include, for example, optical or magnetic disks, such as the storage device 809. Volatile media may include a dynamic memory, such as the main memory 805. Transmission media may include coaxial cables, copper wire and fiber optics, including the wires that include the bus 801. Transmission media may also take the form of acoustic, optical, or electromagnetic waves, such as those generated during Radio Frequency (RF) and infrared (IR) data communications. Common forms of computer-readable media may include, for example, a floppy disk, a flexible disk, hard disk, magnetic tape, any other magnetic medium, a CD-ROM, a Compact Disc-Rewritable (CDRW), a Digital Video Disk (DVD), any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read. In certain cases, the computer readable media may include an unknown physical component wherein the information is uniquely defined by a special digital unique identifier and is available through multiple physical channels either simultaneously or exclusively.

Various forms of computer-readable media may be involved in providing instructions to a processor for execution. For example, the instructions for carrying out at least part of the exemplary embodiments may initially be borne on a magnetic disk of a remote mobile device. In such a scenario, the remote mobile device loads the instructions into the main memory and sends the instructions over a telephone line using a modem. A modem of a local computer system receives the data on the telephone line and uses an infrared transmitter to convert the data to an infrared signal and transmit the infrared signal to a portable computing device, such as a Personal Digital Assistant (PDA) or a laptop. An infrared detector on the portable computing device receives the information and instructions borne by the infrared signal and places the data on a bus. The bus conveys the data to a main memory, from which a processor retrieves and executes the instructions. The instructions received by the main memory can optionally be stored on storage device either before or after execution by processor.

Figure 9:
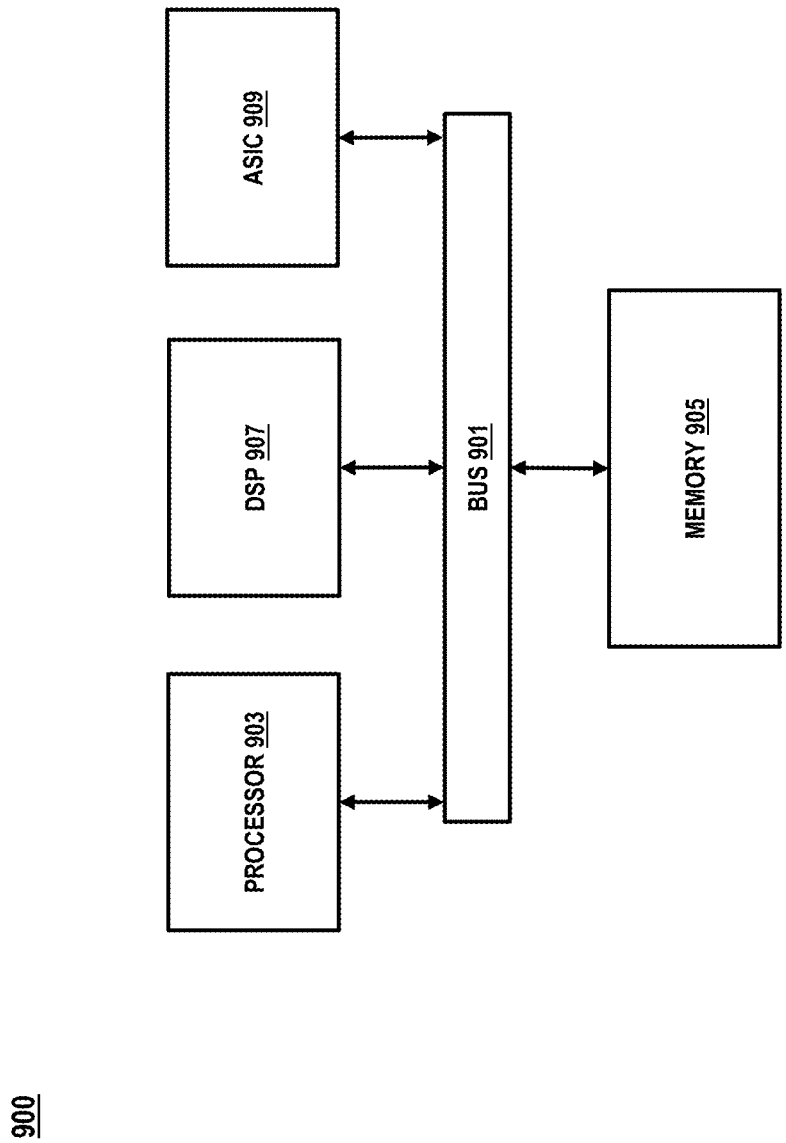
FIG. 9 is a diagram of a chip set upon which an embodiment of the invention may be implemented, according to one embodiment.

FIG. 9 illustrates a chip set 900 upon which an embodiment of the invention may be implemented. The chip set 900 is programmed to present a slideshow as described herein and includes, for instance, the processor and memory components described with respect to FIG. 8 incorporated in one or more physical packages (e.g., chips). By way of example, a physical package may include an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core to perform independently. A multi-core processor enables multiprocessing within a single physical package. Examples of a multi-core processor may include two, four, eight, or greater numbers of processing cores. Alternatively, or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more Digital Signal Processors (DSP) 907, or one or more Application-Specific Integrated Circuits (ASIC) 909. The DSP 907 typically processes real-world signals (e.g., sound) in real-time independently of the processor 903. Similarly, the ASIC 909 may perform specialized functions not easily performed by a general purposed processor. Other specialized components to aid in performing the inventive functions described herein include one or more Field Programmable Gate Arrays (FPGA) (not shown), one or more controllers (not shown), or one or more other special-purpose computer chips.

The processor 903 and accompanying components have connectivity to the memory 905 via the bus 901. The memory 905 may include both a dynamic memory (e.g., RAM, magnetic disk, writable optical disk, etc.) and a static memory (e.g., ROM, CD-ROM, etc.) for storing executable instructions that when executed perform the inventive steps described herein to controlling a mobile device. The memory 905 also stores the data associated with or generated by the execution of the inventive steps.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   receiving, by a device, information indicating a plurality of trusted wireless access identifiers;
   detecting, by the device, one or more wireless networks of which the mobile device is in range, the one or more wireless networks each being associated with a particular wireless access identifier;
   comparing, by the device, the trusted wireless access identifiers to the one or more wireless access identifiers associated with the one or more detected wireless networks;
   determining, by the device and based on the comparing, that a set of wireless access identifiers, of the wireless access identifiers associated with the one or more detected wireless networks, which do not correspond to any of the trusted wireless access identifiers, are untrusted wireless access identifiers;

presenting, via a visual interface of the device, information regarding the one or more wireless access identifiers associated with the one or more detected wireless networks, the presenting including presenting:
the set of untrusted wireless access identifiers, and
an indication that each wireless access identifier, of the set of untrusted wireless access identifiers, is not trusted;

receiving, by the device, a selection to use a particular wireless network that is associated with a particular untrusted wireless access identifier, of the set of untrusted wireless access identifiers; and initiating, based on the selection of the particular untrusted wireless access identifier, a virtual private connection for the device.

2. The method of claim 1, wherein the information indicating the plurality of trusted wireless access identifiers further includes a range of times during which a particular wireless access identifier is trusted.

3. The method of claim 2, further comprising:
determining whether a time, at which the one or more wireless networks are detected, is within the range of times at which the particular wireless access identifier is trusted;
determining that the time, at which the one or more wireless networks are detected, falls outside of the range of times at which the particular wireless access identifier is trusted; and
determining, based on determining that the time, at which the one or more wireless networks are detected, falls outside of the range of times, that the particular wireless access identifier is untrusted,
wherein presenting the information regarding the one or more wireless access identifiers associated with the one or more detected wireless networks further includes presenting the particular wireless access identifier as an untrusted wireless access identifier.

4. The method of claim 1, wherein presenting the information regarding the one or more wireless access identifiers associated with the one or more detected wireless networks further includes presenting information indicating an approved use for at least one of the one or more detected wireless networks.

5. The method of claim 1, wherein presenting the information regarding the one or more wireless access identifiers associated with the one or more detected wireless networks further includes presenting information indicating an approved duration of time during which at least one, of the one or more detected wireless networks, may be used.

6. The method of claim 1, wherein initiating the virtual private connection includes receiving session set-up information for the establishment of the virtual private connection over a communication connection that is distinct from a wireless connection that is supported by the selected particular wireless network.

7. The method of claim 1, wherein the plurality of trusted wireless access identifiers include service set identifiers (SSIDs),
the method further comprising monitoring for the plurality of wireless access points using the SSIDs,
wherein the untrusted wireless access identifiers are SSIDs that are not included in the plurality of trusted wireless access identifiers.

8. A device, comprising:
a non-transitory computer-readable medium storing a set of processor-executable instructions; and
one or more processors configured to execute the processor-executable instructions, wherein executing the processor-executable instructions causes the one or more processors to:
receive information indicating a plurality of trusted wireless access identifiers;
detect one or more wireless networks of which the mobile device is in range, the one or more wireless networks each being associated with a particular wireless access identifier;
compare the trusted wireless access identifiers to the one or more wireless access identifiers associated with the one or more detected wireless networks;
determine, based on the comparing, that a set of wireless access identifiers, of the wireless access identifiers associated with the one or more detected wireless networks, which do not correspond to any of the trusted wireless access identifiers, are untrusted wireless access identifiers;
present information regarding the one or more wireless access identifiers associated with the one or more detected wireless networks, the presenting including presenting:
the set of untrusted wireless access identifiers, and
an indication that each wireless access identifier, of the set of untrusted wireless access identifiers, is not trusted;
receive a selection to use a particular wireless network that is associated with a particular untrusted wireless access identifier, of the set of untrusted wireless access identifiers; and
initiate, based on the selection of the particular untrusted wireless access identifier, a virtual private connection for the device.

9. The device of claim 8, wherein the information indicating the plurality of trusted wireless access identifiers further includes a range of times during which a particular wireless access identifier is trusted,
wherein executing the processor-executable instructions further causes the one or more processors to:
determine whether a time, at which the one or more wireless networks are detected, is within the range of times at which the particular wireless access identifier is trusted;
determine that the time, at which the one or more wireless networks are detected, falls outside of the range of times at which the particular wireless access identifier is trusted; and
determine, based on determining that the time, at which the one or more wireless networks are detected, falls outside of the range of times, that the particular wireless access identifier is untrusted,
wherein executing the processor-executable instructions, to present the information regarding the one or more wireless access identifiers associated with the one or more detected wireless networks, further causes the one or more processors to present the particular wireless access identifier as an untrusted wireless access identifier.

10. The device of claim 8, wherein executing the processor-executable instructions, to present the information regarding the one or more wireless access identifiers associated with the one or more detected wireless networks, further causes the one or more processors to present information indicating an approved use for at least one of the one or more detected wireless networks.

11. The device of claim 8, wherein executing the processor-executable instructions, to present the information regarding the one or more wireless access identifiers associated with the one or more detected wireless networks, further causes the one or more processors to present information indicating an approved duration of time during which at least one, of the one or more detected wireless networks, may be used.

12. The device of claim 8, wherein executing the processor-executable instructions, to initiate the virtual private connection, further causes the one or more processors to initiate the virtual private connection automatically, in response to the selection of the particular untrusted wireless access identifier.

13. The device of claim 8, wherein executing the processor-executable instructions, to initiate the virtual private connection, further causes the one or more processors to receive session set-up information for the establishment of the virtual private connection over a communication connection that is distinct from a wireless connection that is supported by the selected particular wireless network.

14. The device of claim 8, wherein the plurality of trusted wireless access identifiers include service set identifiers (SSIDs),
wherein executing the processor-executable instructions further causes the one or more processors to monitor for the plurality of wireless access points using the SSIDs,
wherein the untrusted wireless access identifiers are SSIDs that are not included in the plurality of trusted wireless access identifiers.

15. A non-transitory computer-readable medium storing a set of processor-executable instructions, wherein execution of the processor-executable instructions, by one or more processors of a device, causes the one or more processors to:
receive information indicating a plurality of trusted wireless access identifiers;
detect one or more wireless networks of which the mobile device is in range, the one or more wireless networks each being associated with a particular wireless access identifier;
compare the trusted wireless access identifiers to the one or more wireless access identifiers associated with the one or more detected wireless networks;
determine, based on the comparing, that a set of wireless access identifiers, of the wireless access identifiers associated with the one or more detected wireless networks, which do not correspond to any of the trusted wireless access identifiers, are untrusted wireless access identifiers;
present information regarding the one or more wireless access identifiers associated with the one or more detected wireless networks, the presenting including presenting:
the set of untrusted wireless access identifiers, and
an indication that each wireless access identifier, of the set of untrusted wireless access identifiers, is not trusted;
receive a selection to use a particular wireless network that is associated with a particular untrusted wireless access identifier, of the set of untrusted wireless access identifiers; and
initiate, based on the selection of the particular untrusted wireless access identifier, a virtual private connection for the device.

16. The non-transitory computer-readable medium of claim 15, wherein the information indicating the plurality of trusted wireless access identifiers further includes a range of times during which a particular wireless access identifier is trusted,
wherein the processor-executable instructions further include processor-executable instructions to:
determine whether a time, at which the one or more wireless networks are detected, is within the range of times at which the particular wireless access identifier is trusted;
determine that the time, at which the one or more wireless networks are detected, falls outside of the range of times at which the particular wireless access identifier is trusted; and
determine, based on determining that the time, at which the one or more wireless networks are detected, falls outside of the range of times, that the particular wireless access identifier is untrusted,
wherein executing the processor-executable instructions, to present the information regarding the one or more wireless access identifiers associated with the one or more detected wireless networks, further causes the one or more processors to present the particular wireless access identifier as an untrusted wireless access identifier.

17. The non-transitory computer-readable medium of claim 15, wherein the processor-executable instructions, to present the information regarding the one or more wireless access identifiers associated with the one or more detected wireless networks, further include processor-executable instructions to present information indicating an approved use for at least one of the one or more detected wireless networks.

18. The non-transitory computer-readable medium of claim 15, wherein the processor-executable instructions, to present the information regarding the one or more wireless access identifiers associated with the one or more detected wireless networks, further include processor-executable instructions to present information indicating an approved duration of time during which at least one, of the one or more detected wireless networks, may be used.

19. The non-transitory computer-readable medium of claim 15, the processor-executable instructions, to initiate the virtual private connection, further include processor-executable instructions to initiate the virtual private connection automatically, in response to the selection of the particular untrusted wireless access identifier.

20. The non-transitory computer-readable medium of claim 15, wherein the plurality of trusted wireless access identifiers include service set identifiers (SSIDs),
wherein the processor-executable instructions further include processor-executable instructions to monitor for the plurality of wireless access points using the SSIDs,
wherein the untrusted wireless access identifiers are SSIDs that are not included in the plurality of trusted wireless access identifiers.

* * * * *